No. 749,420.　　　　　　　　　　　　　　　　　Patented January 12, 1904.

UNITED STATES PATENT OFFICE.

JESSE D. BOURDEAU, OF BATTLECREEK, MICHIGAN, ASSIGNOR TO BOURDEAU FOOD COMPANY, LIMITED, OF BATTLECREEK, MICHIGAN.

METHOD OF MAKING CEREAL MALTED FOOD.

SPECIFICATION forming part of Letters Patent No. 749,420, dated January 12, 1904.

Application filed March 11, 1902. Serial No. 97,758. (No specimens.)

*To all whom it may concern:*

Be it known that I, JESSE D. BOURDEAU, a citizen of the United States, residing at Battlecreek, in the county of Calhoun and State of Michigan, have invented certain new and useful Improvements in Methods of Making Cereal Malted Food, of which the following is a specification.

My invention is concerned with a novel method of manufacturing a cereal food in which the cereal is partially malted to start the conversion of the starch in the sugar.

In carrying out my invention I take some cereal, preferably wheat. The whole grains are cleaned and are then steeped for twelve hours or more, depending upon the character of the wheat and the temperature at which the steeping occurs, which is preferably about 60° Fahrenheit. After the steeping is completed the grain is allowed to malt for about four days or until the average length of the acrospires is one-half the length of the grain or less. This partial malting may be carried on by any of the well-known processes and apparatus and differs from the ordinary malting in that it is terminated sooner, the ordinary malting being continued until the average length of the acrospires is equal to the length of the grains. Before cooking I preferably pass the grain through a scouring-machine or some similar device, which knocks off the acrospires or sprouts that have developed during the process of malting. Of course it is not essential that these should be removed; but I prefer to remove them. When the malting is completed to the extent described, if the process is not to be completed immediately, as would be the case where the grain is malted in one establishment and finished in another, the malt is dried in the customary manner. When the process is to be finished, in case the grain has been dried it must be soaked again until it is in substantially the same state that it was at the time the malting was completed. The next step in the process, whether directly after the malting or after the soaking of the dried malt has been completed, is the cooking. This may be carried out in any form of a cooker; but I preferably employ one of the forms shown in my application, Serial No. 90,539, filed January 20, 1902, and my applications, Serial Nos. 93,571, 93,572, and 93,573, filed February 11, 1902. This cooking is carried on for about twenty minutes at a temperature of about 250° Fahrenheit and under a pressure of fifteen pounds. The cooked grain is next cured, preferably by passing it through a drier, such as is shown in my application, Serial No. 90,538, filed January 20, 1902, in which a current of cool air is drawn through to extract the moisture, while preventing its being baked at all. The curing may be entirely completed in the drier by increasing the length of the drier and the amount of time that it remains therein; but I preferably partially complete the curing in the drier and finish by storing it for about twelve hours in cool bins through which cool air circulates. At this time salt to taste is mixed with the grain. The amount ordinarily employed is about one and one-half per cent. In case any sweetening is desired to give an additional flavor to the grain it is preferably introduced at this point, and it may take any desired form, such as sugar, honey, saccharin, maltose, or any other desired material. The cured grain is now passed through the customary rolls to flatten it into flakes. These rolls may be hot or cold, as desired. If it is desired to granulate the food, it is passed through a second pair of rolls. The rolled flakes thus produced can then be baked in the customary manner for such a length of time and at such a temperature as may be necessary to give them a slightly brown color and make them perfectly crisp. After the baking is completed the food is ready to be packaged in the customary manner.

While I have described my invention as carried out by the process which I at present consider best adapted to carry out its purposes, it will be understood that it is capable of some modifications and that I do not desire to be limited in the interpretation of the following claims except as may be necessitated by the state of the prior art.

While I have herein described a specific food produced by this process, I do not herein claim the same, but reserve the same for a divisional application, No. 115,590, filed July 14, 1902.

What I claim as new, and desire to secure by Letters Patent of the United States, is—

1. The process of preparing malted cereal foods which consists in: first, partially malting the grain until the average length of the acrospires is one-half the length of the grain; second, cooking the grain thus partially malted; third, cooling and curing the cooked grain; and fourth, flaking the grain.

2. The process of preparing malted cereal foods which consists in: first, partially malting the grain until the average length of the acrospires is one-half the length of the grains; second, cooking the grain thus partially malted; third, cooling and curing the cooked grain; fourth, flaking the grain; and fifth, baking it.

In testimony whereof I affix my signature in presence of two witnesses.

JESSE D. BOURDEAU.

Witnesses:
 JOHN H. McELROY,
 HATTIE O. HALVORSON.